US012397505B2

(12) United States Patent
Korten et al.

(10) Patent No.: US 12,397,505 B2
(45) Date of Patent: Aug. 26, 2025

(54) ADDITIVE MANUFACTURING APPARATUS INCLUDING TWO LIGHT ENGINES AND A LIGHT ALTERING STRUCTURE AND A METHOD OF ADDITIVE MANUFACTURING A THREE-DIMENSIONAL OBJECT

(71) Applicant: Solventum Intellectual Properties Company, Maplewood, MN (US)

(72) Inventors: Malte Korten, Moorenweis (DE); Nicholas S. Wren, Woodbury, MN (US); Gareth A. Hughes, St. Paul, MN (US); Benjamin C. MacMurray, Minneapolis, MN (US); Kyle C. Picha, Maplewood, MN (US); Jesse J. Gilles, River Falls, WI (US); Leif J. Erickson, St. Paul, MN (US); Eric H. Tsai, St. Paul, MN (US); Matthew T. Lingscheit, Hugo, MN (US); Gioacchino Raia, Tuerkenfeld (DE); Bastian P. Kirchner, Fuerstenfeldbruck (DE); Christian A. Richter, Feldafing (DE); Jeffrey N. Bartow, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 148 days.

(21) Appl. No.: 18/552,252

(22) PCT Filed: Feb. 23, 2022

(86) PCT No.: PCT/IB2022/051603
§ 371 (c)(1),
(2) Date: Sep. 25, 2023

(87) PCT Pub. No.: WO2022/200873
PCT Pub. Date: Sep. 29, 2022

(65) Prior Publication Data
US 2024/0157642 A1 May 16, 2024

Related U.S. Application Data

(60) Provisional application No. 63/165,853, filed on Mar. 25, 2021.

(51) Int. Cl.
*B33Y 10/00* (2015.01)
*B29C 64/135* (2017.01)
(Continued)

(52) U.S. Cl.
CPC .......... *B29C 64/282* (2017.08); *B29C 64/135* (2017.08); *B29C 64/255* (2017.08);
(Continued)

(58) Field of Classification Search
None
See application file for complete search history.

(56) References Cited

U.S. PATENT DOCUMENTS 7,758,329 B2 * 7/2010 Kihara .................. B33Y 50/02
264/494
9,632,420 B2    4/2017 Allanic
(Continued)

FOREIGN PATENT DOCUMENTS

CN      110653485 B      7/2021
DE    102015207834 A1   11/2016
(Continued)

OTHER PUBLICATIONS

International Search Report for PCT International Application No. PCT/IB2022/051603, mailed on May 24, 2022, 4 pages.

*Primary Examiner* — Yung-Sheng M Tsui

(57) ABSTRACT

The present disclosure provides apparatuses and methods for manufacturing three-dimensional objects. Each additive
(Continued)

manufacturing apparatus (1000, 2000, 3000) includes: a) a reservoir (1100, 2100, 3100) for receiving hardenable material; b) a first movable light engine (1200, 2200, 3200) providing a first light radiation configuration; a second light engine (1300, 2300, 3300) providing a second light radiation configuration that is different than the first light radiation configuration; and d) a light altering structure (1400, 2400, 3400). The light altering structure is located between the reservoir and light radiated from at least one of the first movable light engine or the second light engine. The first movable light engine is configured to radiate light onto a first focal plane (2220) within the reservoir containing the hardenable material and the second light engine is configured to radiate light onto a second focal plane (2320) within the reservoir containing the hardenable material. The method includes: a) obtaining a hardenable material disposed in a reservoir; b) selectively radiating light having a first light radiation configuration from a first movable light engine; and c) selectively radiating light having a second light radiation configuration from a second light engine onto a second focal plane within the hardenable material. The apparatuses and methods can advantageously form objects having different resolutions on demand using the same apparatus, plus optionally can blend light from multiple light engines.

20 Claims, 4 Drawing Sheets

(51) Int. Cl.
*B29C 64/255* (2017.01)
*B29C 64/282* (2017.01)
*B29C 64/393* (2017.01)
*B33Y 30/00* (2015.01)
*B33Y 50/02* (2015.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,040,224 | B2 | 8/2018 | Saruhashi et al. |
| 10,495,973 | B2 | 12/2019 | Cole |
| 11,207,735 | B2 | 12/2021 | Koch et al. |
| 2007/0031791 | A1 | 2/2007 | Cinader, Jr. et al. |
| 2017/0113406 | A1* | 4/2017 | Chen ................ B33Y 10/00 |
| 2017/0348913 | A1* | 12/2017 | Lin .................. B29C 64/264 |
| 2018/0056605 | A1 | 3/2018 | Chen et al. |
| 2020/0031051 | A1 | 1/2020 | Wynne et al. |
| 2020/0282638 | A1 | 9/2020 | Holt et al. |

FOREIGN PATENT DOCUMENTS

| | | | |
|---|---|---|---|
| DE | 102018201901 A1 | 8/2019 | |
| JP | 4969058 B2 | 7/2012 | |
| WO | 2016138345 A1 | 9/2016 | |
| WO | 2018038954 A1 | 3/2018 | |
| WO | 2018231583 A1 | 12/2018 | |
| WO | 2020154703 A1 | 7/2020 | |
| WO | 2022038441 A1 | 2/2022 | |
| WO | WO-2023194559 A1 * | 10/2023 | ........... B29C 64/129 |

* cited by examiner

ADDITIVE MANUFACTURING APPARATUS INCLUDING TWO LIGHT ENGINES AND A LIGHT ALTERING STRUCTURE AND A METHOD OF ADDITIVE MANUFACTURING A THREE-DIMENSIONAL OBJECT

CROSS REFERENCE TO RELATED APPLICATIONS

This application is a national stage filing under 35 U.S.C. 371 of PCT/IB2022/051603, filed Feb. 23, 2022, which claims the benefit of Provisional Application No. 63/165,853, filed Mar. 25, 2021, the disclosures of each of which are incorporated herein by reference their entireties.

FIELD

The present disclosure relates to additive manufacturing apparatuses and techniques for forming three-dimensional objects.

BACKGROUND

Additive manufacturing techniques have been employed for many industries. Further advancements in their efficiency and precision would increase their applicability for a wider range of objects to be manufactured.

SUMMARY

Apparatuses and methods for preparing three-dimensional objects are provided.

In a first aspect, an apparatus is provided. The apparatus includes a) a reservoir for receiving hardenable material; b) a first movable light engine providing a first light radiation configuration; c) a second light engine providing a second light radiation configuration that is different than the first light radiation configuration; and d) a light altering structure. The light altering structure is located between the reservoir and light radiated from at least one of the first movable light engine or the second light engine. The first movable light engine is configured to radiate light onto a first focal plane within the reservoir containing the hardenable material and the second light engine is configured to radiate light onto a second focal plane within the reservoir containing the hardenable material.

In a second aspect, a method is provided. The method includes a) obtaining a hardenable material disposed in a reservoir and b) selectively radiating light having a first light radiation configuration from a first movable light engine, the light optionally contacting a light altering structure. At least a portion of the light is directed onto a first focal plane within the hardenable material to selectively form a first portion of hardened material. The method further includes c) selectively radiating light having a second light radiation configuration from a second light engine, the light optionally contacting the light altering structure. At least a portion of the light is directed onto a second focal plane within the hardenable material to selectively form a second portion of hardened material. The second light radiation configuration is different than the first light radiation configuration. The light from at least one of the first movable light engine or the second light engine contacts the light altering structure. The hardened material is a three-dimensional object and the first portion of hardened material has a physical quality that is different than the second portion of hardened material.

At least certain embodiments of such apparatuses and methods advantageously employ light engines with different configurations in a single apparatus to print high- or low-resolution objects on demand. Moreover, the light from the two engines may be mixed/blended in the optical path using the light altering structure.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

Figure 1:
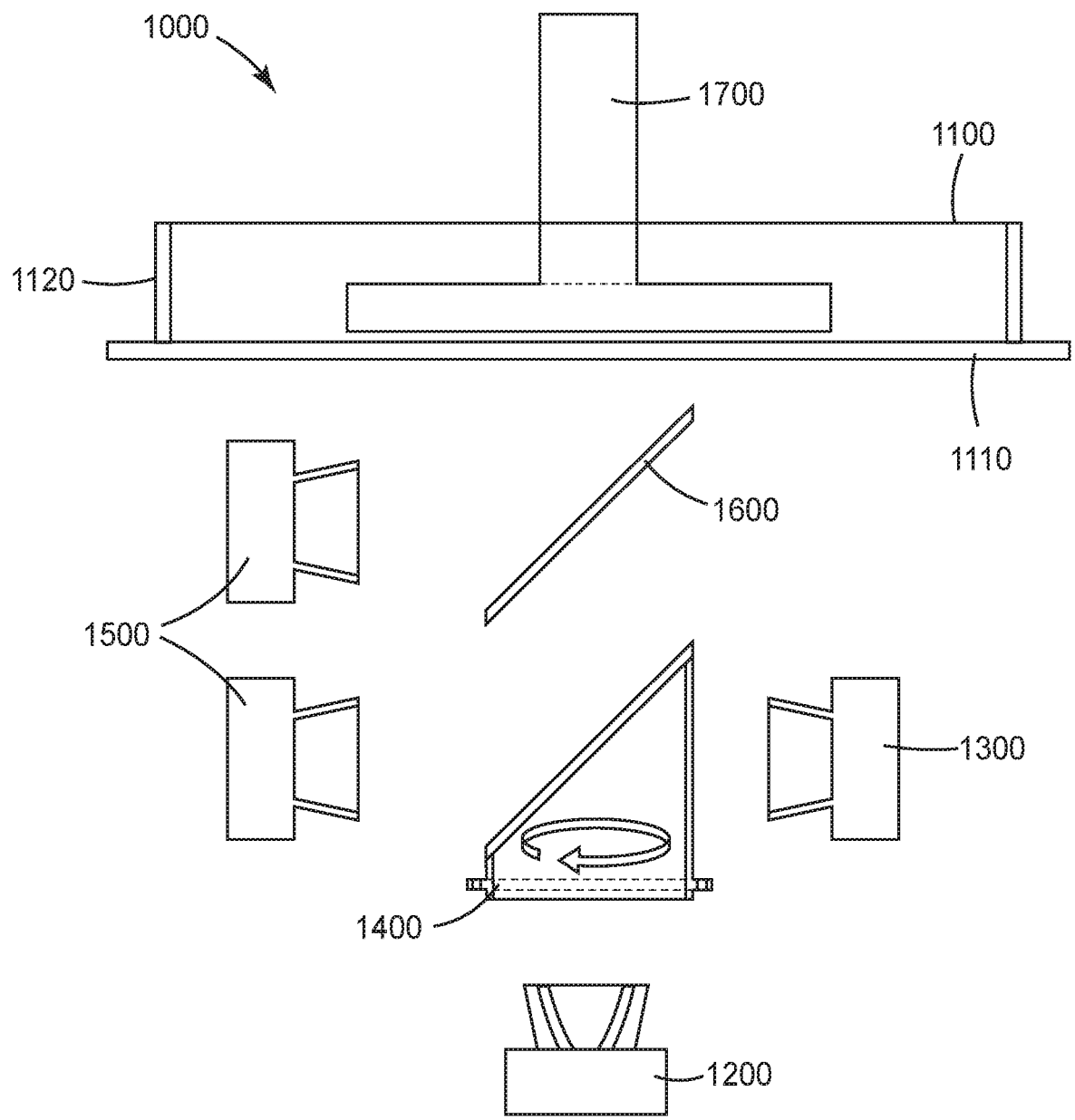
FIG. 1 is a schematic side view of an exemplary additive manufacturing apparatus of the present disclosure.

While the above-identified figures set forth several embodiments of the disclosure, other embodiments are also contemplated, as noted in the description. The figures are not necessarily drawn to scale. In all cases, this disclosure presents the invention by way of representation and not limitation.

DETAILED DESCRIPTION

Conventional additive manufacturing systems use a fixed resolution for light radiation to form three-dimensional objects. When a large build space is needed, the usual approach is to choose, for instance, large pixel sizes, with the drawback of a limited resolution. When high resolution is needed, the usual approach is to choose small pixel sizes, with the drawback of a limited build space.

To print large parts with high resolution, there are three approaches available in the market. The first is to use multiple projectors (e.g., Rapid Shape D90, first generation, from Rapid Shape GmbH, Heimsheim, Germany) and the second is to use moving projectors (e.g. MOVINGLight from Prodways Tech, Les Mureaux, France) to address both requirements. A drawback of these approaches is that artefacts (e.g., an artificial/undesirable product or effect) and material inhomogeneity can occur in overlapping zones that have been irradiated by the multiple or moving projectors. The third is to use a continuous moving laser beam (e.g., DMP Factory 500 Solution from 3D Systems, Rock Hill, SC) and/or a shutter system in combination with a stereolithography apparatus. The laser continuously provides light while moving along the outer contour(s) of each layer. Advantages include high resolution over the whole build area, plus a smooth surface and accuracy in the x-y axes without pixel artefacts on the edges of the final object. A drawback of this approach is the complexity and limited exposure speed.

It has been discovered that it is possible to improve the efficiency and resolution of additive manufacturing by employing at least two light engines (one or more of which is moveable) having different light radiation configurations from each other, plus at least one light altering structure (e.g., a mirror that is rotatable or selectively transparent). Optionally, radiation from a second (optionally movable) projector can be blended in the optical path to improve process time and optical resolution, such as by using the light altering structure or a second light altering structure (e.g., a semitransparent mirror, a beam splitter, and/or a beam combiner). Furthermore, inline process control can be incorporated into these approaches.

Glossary

As used herein, "focal plane" refers to a plane in the x-y axes.

As used herein, "light engine" refers to an apparatus that comprises at least a light source (e.g., a light module) and optics.

As used herein, "light radiation configuration" refers collectively to light engine components (e.g., light source, optics, etc.), designs, and settings (e.g., wavelengths, dosages, optical resolution, zoom, etc.). A change in even a single feature of the light radiation configuration results in a different light radiation configuration as compared to prior to the change.

As used herein, "light altering structure" refers to a component that, when light is directed towards the component for a period of time, 1) is selectively transparent to the light during at least a part of the time; or 2) reflects all of the light during a part of the time. Suitable light altering structures include for instance, a rotatable mirror, a selectively transparent mirror, a rotatable selectively transparent mirror, a beam splitter, a beam combiner, or any combination thereof. When the light altering structure comprises a rotatable mirror, the mirror is configured to rotate out of the path of the light during a part of the time that the light is directed towards the mirror; in effect, during that time, the light is directed towards where the mirror had been located when the light was reflected by the mirror.

As used herein, "selectively transparent" refers to being partially or fully transparent to certain wavelengths of light or transparent to a certain amount of all wavelengths of light. When partially transparent, the term additionally refers to being partially reflective of other wavelengths of light or to an amount of all wavelengths of light.

As used herein, a "beam splitter" refers to a device that divides incident light into separate beams of different wavelengths in divergent directions. The beam splitter reflects one of the separate beams and passes the other through the device. Optionally, the beam splitter is a polarization beam splitter, which divides incident light into separate beams having different polarizations of light (e.g., linear or circular polarization). A polarization beam splitter may use a Brewster prism, which relies on total internal reflection of one linear polarization at Brewster's angle of incidence.

As used herein, a "beam combiner" refers to a device that couples two or more wavelength beams of light into a single beam, in which at least one of the wavelength beams is in transmission and one is in reflection.

As used herein, "actinic radiation" encompasses UV radiation, e-beam radiation, visible radiation, infrared radiation, gamma radiation, and any combination thereof.

As used herein, a "monomer" is a single, one unit molecule capable of combination with itself or other monomers to form oligomers or polymers; an "oligomer" is a component having 2 to 9 repeat units; and a "polymer" is a component having 10 or more repeat units.

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from two to twelve carbon atoms, e.g., methylene, ethylene, propylene, 2-methylpropylene, pentylene, hexylene, and the like.

As used herein, "alkenyl" refers to a monovalent linear or branched unsaturated aliphatic group with one or more carbon-carbon double bonds, e.g., vinyl. Unless otherwise indicated, the alkenyl groups typically contain from two to twenty carbon atoms.

As used herein, "alkenediyl" refers to a straight-chained, branched, or cyclic divalent unsaturated aliphatic group, e.g., —CH=CH—, —CH=C(CH$_3$)CH$_2$—, —CH=CHCH$_2$—, and the like.

Unless otherwise indicated, the alkenediyl groups typically contain from two to twenty carbon atoms.

As used herein, the term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

As used herein, the term "substituted aryl" refers to an aryl group substituted with at least one alkyl group, substituted with at least one alkoxy group, or substituted with at least one alkyl group plus at least one alkoxy group. The substituted aryl group contains 6 to 40 carbon atoms.

The substituted aryl group often contains an aryl group having 5 to 20 carbon atoms and at least one alkyl group and/or alkoxy group each having 1 to 20 carbon atoms.

As used herein, the term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

As used herein, the term "ethylenically unsaturated" refers to a double bond between two carbon atoms, and includes functional groups such as vinyl (H$_2$C=CH—), including vinyl ethers (H$_2$C=CHO—), vinyl esters (H$_2$C=CHOCO—), styrene (e.g., vinylbenzene) and alkenyl (H$_2$C=CH(CH$_2$)$_n$—, wherein n typically ranges from 1 to 30 or 1 to 20 or 1 to 10). Ethylenically unsaturated groups also include (meth)acryl such as (meth)acrylamide (H$_2$C=CHCONH— and H$_2$C=CH(CH$_3$)CONH—) and (meth)acrylate (CH$_2$=CHCOO— and CH$_2$=C(CH$_3$)COO—).

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl group, and linked by an aliphatic segment if containing two or more groups. As used herein, "(meth)acrylate-functional compounds" are compounds that include, among other things, a (meth)acrylate moiety. The term "(meth)acryloyl" refers to a group of formula $CH_2=CHR^b-(CO)-$ where $R^b$ is hydrogen or methyl and the group —(CO)— refers to a carbonyl group.

As used herein, "liquid" refers to the state of matter that is not solid or gas, which has a definite volume and an indefinite shape.

As used herein, "curing" and "polymerizing" each mean the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by one or more curing mechanisms.

As used herein, "hardenable material" refers to a photopolymerizable composition containing at least one material that can be hardened or partially hardened using actinic radiation. Suitable hardenable materials include a liquid and/or a paste.

As used herein, the term "integral" means composed of parts that together constitute a whole.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Further herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Apparatuses

In a first aspect, an additive manufacturing apparatus is provided. The apparatus comprises:
 a) a reservoir for receiving hardenable material;
 b) a first movable light engine providing a first light radiation configuration, the first movable light engine configured to radiate light onto a first focal plane within the reservoir containing the hardenable material;
 c) a second light engine providing a second light radiation configuration that is different than the first light radiation configuration, the second light engine configured to radiate light onto a second focal plane within the reservoir containing the hardenable material; and
 d) a light altering structure located between the reservoir and light radiated from at least one of the first movable light engine or the second light engine.

Referring to FIG. 1, a schematic side view an exemplary apparatus (e.g., 3D printing system) 1000 according to the present disclosure is illustrated, comprising a reservoir 1100 for receiving hardenable material. The reservoir 1100 comprises a transparent base 1110 and four side walls 1120, of which only two are visible in FIG. 1 due to the side view of the apparatus 1000 shown in the figure. The transparent base 1110 and the four side walls 1120 define a volume for receiving the hardenable material (not shown).

The apparatus further comprises a first movable light engine 1200 providing a first light radiation configuration, the first movable light engine 1200 configured to radiate light onto a first focal plane within the reservoir 1100 containing the hardenable material. The apparatus 1000 further comprises a second light engine 1300 providing a second light radiation configuration that is different than the first light radiation configuration, the second light engine 1300 configured to radiate light onto a second focal plane within the reservoir 1100 containing the hardenable material; and a light altering structure 1400 located between the reservoir 1100 and light radiated from at least one of the first movable light engine 1200 or the second light engine 1300. In this case, the light altering structure is a rotatable mirror, as indicated by the curved arrow. The apparatus 1000 of FIG. 1 further comprises two additional light engines 1500 and a second light altering structure 1600 that is a selectively transparent mirror. Additionally, a build platform 1700 is provided, configured to raise a three-dimensional object within the reservoir 1100 during the additive manufacturing process.

Figure 2:
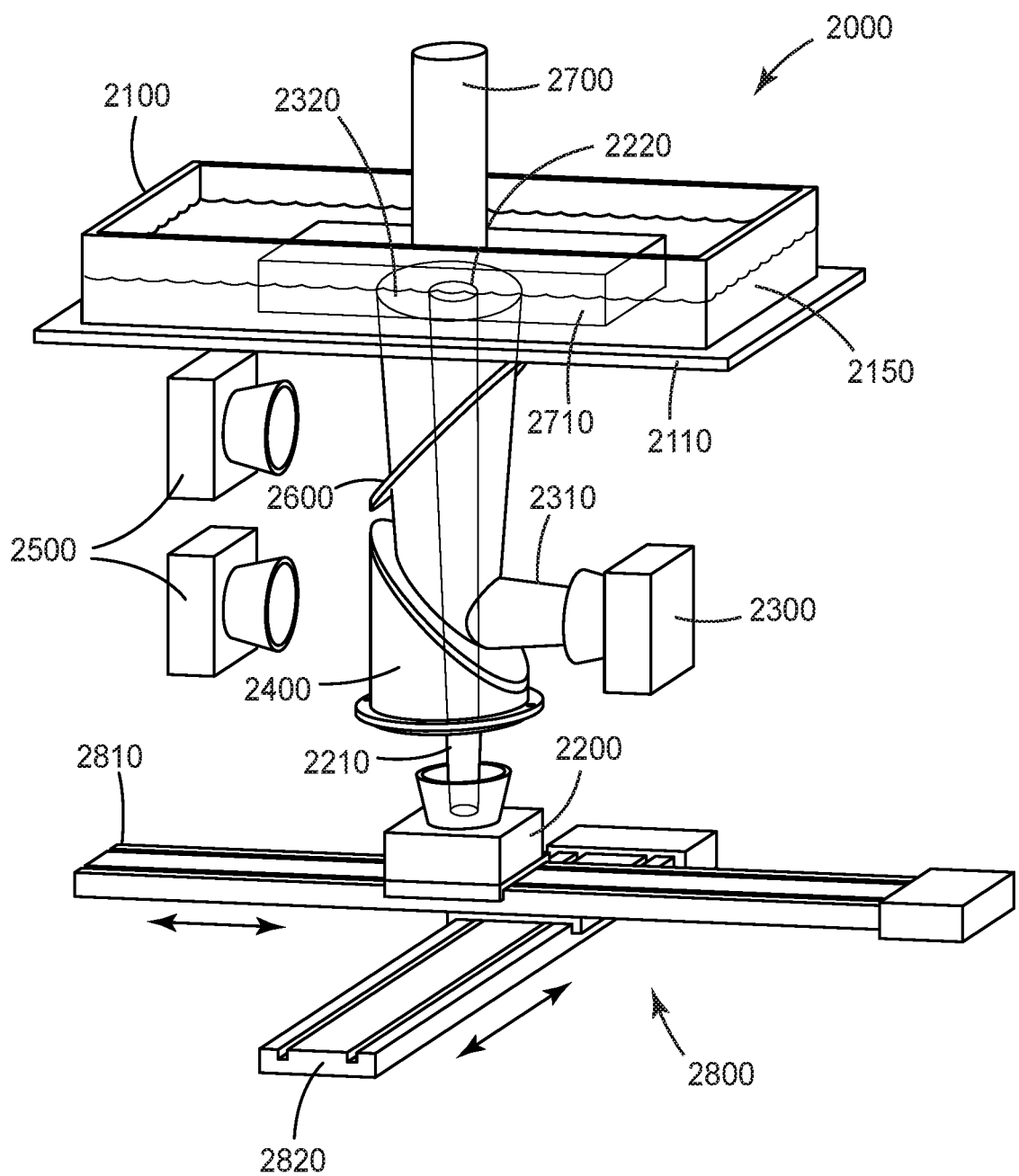
FIG. 2 is a schematic perspective view of another exemplary additive manufacturing apparatus of the present disclosure.

Referring to FIG. 2, a schematic perspective view of another exemplary apparatus 2000 according to the present disclosure is illustrated, comprising a reservoir 2100 for receiving hardenable material 2150; a first movable light engine 2200 providing a first light radiation configuration, the first movable light engine 2200 configured to radiate light 2210 onto a first focal plane 2220 within the reservoir 2100 containing the hardenable material 2150. The apparatus 2000 further comprises a second light engine 2300 providing a second light radiation configuration that is different than the first light radiation configuration, the second light engine 2300 configured to radiate light 2310 onto a second focal plane 2320 within the reservoir 2100 containing the hardenable material 2150. A focal plane is a plane in each of the x-axis and the y-axis. The x-axis and the y-axis extend substantially parallel to the base of the reservoir, where a first axis extends into the drawing plane and a second axis extends perpendicular to the first axis. The z-axis extends substantially perpendicular to the base of the reservoir.

The first focal plane and the second focal plane shown in this illustration are located on a plane of the hardenable material 2150 that is disposed on the transparent base 2110 of the reservoir 2100 and (partially) overlap each other (with the first focal plane 2220 being a subset of the second focal plane 2320). In some cases, the first focal plane and the second focal plane partially overlap while in other cases the first focal plane and the second focal plane are the same (i.e., fully overlap). Optionally, the first focal plane and the second focal plane do not overlap but are instead separate from each other. Depending on the light radiation conditions of the two focal planes (e.g., different wavelengths and/or dosages), the radiation may result in hardening of the hardenable material to different thicknesses, thus in some cases, there is an overlap of portions of the hardened three-dimensional object in the z-axis, yet the depth is not the same for the areas irradiated by the first focal plane and the second focal plane.

The first movable light engine 2200 is generally configured to be moved in at least one axis, such as in at least two axes or even in three axes. For instance, the apparatus 2000 further comprises a mechanism 2800 configured to move the first light engine 2200 in each of an x-axis and a y-axis. The mechanism 2800 includes a first track 2810 upon which the first light engine 2200 is disposed, which moves the first light engine 2200 back and forth along an x-axis (as indicated by the double-ended arrow adjacent to the first track 2810). The mechanism 2800 further includes a second track 2820 upon which the first track 2810 is disposed, which moves the first track 2810 (and hence also the first light engine 2200) back and forth along a y-axis (as indicated by the double-ended arrow adjacent to the second track 2820). Accordingly, the first focal plane can be moved within an x-y planar field. Optionally, any one or more of additional light engines of the apparatus (e.g., the light engines 2300 and/or 2500) is also movable and configured to be moved in at least one axis, such as by employing a mechanism similar to the mechanism 2800.

Further, the apparatus 2000 comprises a light altering structure 2400 located between the reservoir 2100 and light 2210, 2310 radiated from at least one of the first movable light engine 2200 or the second light engine 2300. As mentioned above, suitable light altering structures include for instance, a rotatable mirror, a selectively transparent mirror, a rotatable selectively transparent mirror, a beam splitter, a beam combiner, or any combination thereof. When the light altering structure 2400 is a rotatable mirror, it can be rotatable around a vertical axis (e.g., as shown by the arrow on mirror 1400 in FIG. 1), or around a horizontal axis, which would enable removing the mirror out of the path of a beam of light from at least one light engine. Often, the light altering structure 2400 is located between the reservoir 2100 and light radiated from each of the first movable light engine 2200 and the second light engine 2300. The apparatus 2000 of FIG. 2 further comprises two additional light engines 2500 and a second light altering structure 2600 that is preferably selectively transparent. Additionally, a build platform 2700 is provided, configured to raise a three-dimensional object attached thereto within the reservoir 2100 during the additive manufacturing process. The build platform 2700 can preferably be displaceable by means of a displacing device (not shown). The build platform 2700 comprises a build plate 2710 onto which the layers of hardenable material are hardened to form the physical three-dimensional object to be manufactured (not shown).

Figure 3:
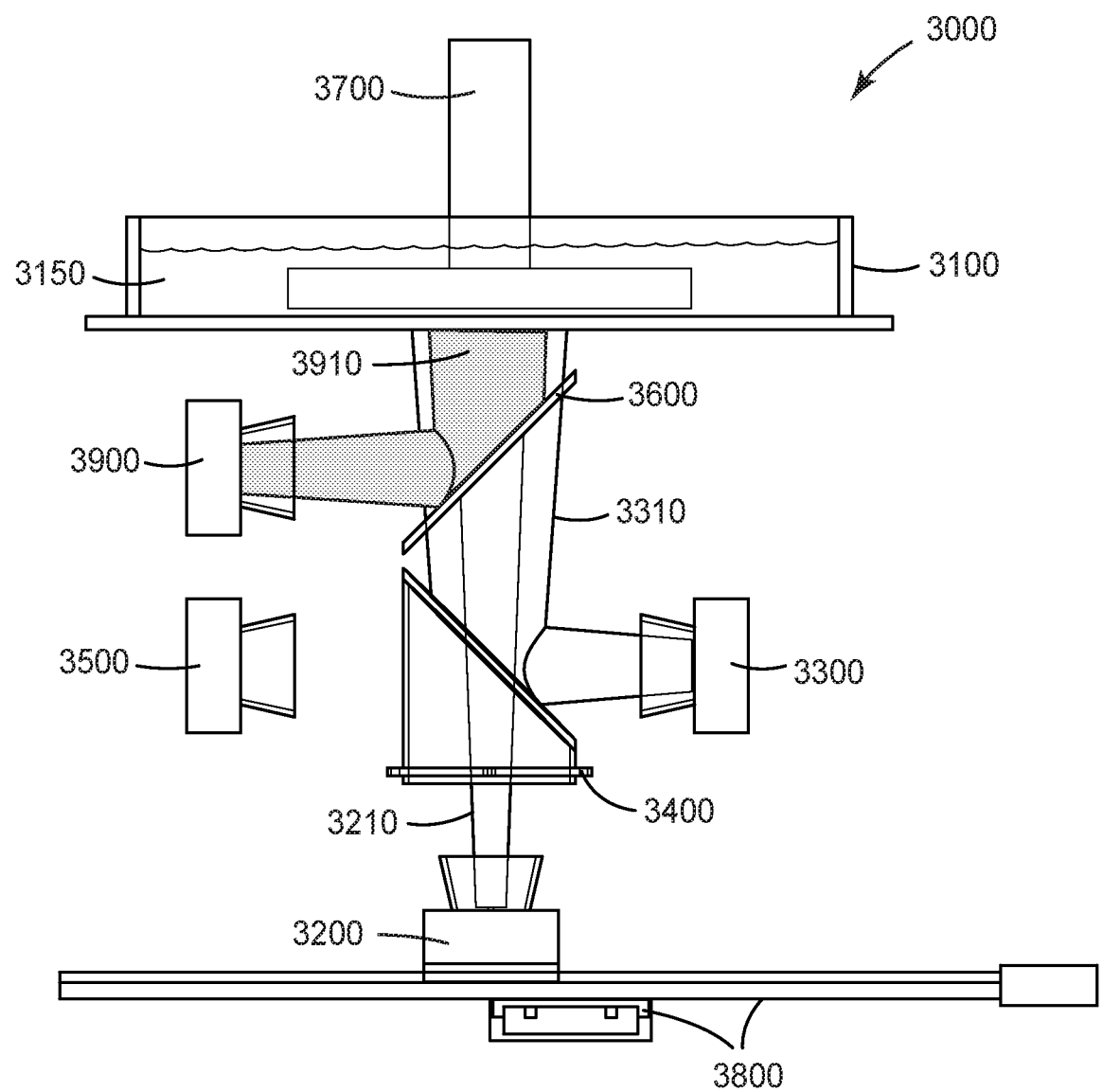
FIG. 3 is a schematic side view of a further exemplary additive manufacturing apparatus of the present disclosure.

Referring to FIG. 3, a schematic side view of an additional exemplary apparatus 3000 according to the present disclosure is illustrated, comprising a reservoir 3100 for receiving hardenable material 3150; a first movable light engine 3200 providing a first light radiation configuration, the first movable light engine 3200 configured to radiate light 3210 onto a first focal plane within the reservoir 3100 containing the hardenable material 3150. The apparatus 3000 further comprises a second light engine 3300 providing a second light radiation configuration that is different than the first light radiation configuration, the second light engine 3300 configured to radiate light 3310 onto a second focal plane within the reservoir 3100 containing the hardenable material 3150.

The first movable light engine 3200 is generally configured to be moved in at least one axis, such as in at least two axes or even in three axes. For instance, the apparatus 3000 further comprises a mechanism 3800 configured to move the first light engine 3200 in each of an x-axis and a y-axis, similar to the mechanism 2800 shown in FIG. 2.

Further, the apparatus 3000 comprises a light altering structure 3400 located between the reservoir 3100 and light 3210, 3310 radiated from at least one of the first movable light engine 3200 or the second light engine 3300. Often, the light altering structure 3400 is located between the reservoir 3100 and light radiated from each of the first movable light engine 3200 and the second light engine 3300. The apparatus 3000 of FIG. 3 further comprises a third light engine 3500 and a second light altering structure 3600 that is preferably selectively transparent. Additionally, a build platform 3700 is provided, configured to raise a three-dimensional object attached thereto within the reservoir 3100 during the additive manufacturing process.

The apparatus 3000 additionally comprises a sensor 3900 directed (e.g., directly or indirectly) at the reservoir 3100 to observe at least one process characteristic selected from bubbles present in the hardenable material 3150, a fill level of the hardenable material 3150 in the reservoir 3100, presence of contaminants in the hardenable material 3150, or defects or deviations from a product design of a three-dimensional object. The sensor 3900 is optionally an optical sensor, such as a photoemissive photodetector, or a camera with a light source. The sensor 3900 in FIG. 3 may direct a beam of light 3910 at the second mirror 3600, which reflects it towards the hardenable material 3150 to measure one or more process characteristic, possibly by imaging or measuring the retroreflected or scattered light (e.g., from bubbles or particles) that follows the same path back from reservoir 3100 to mirror 3600 and on to sensor 3900. Optionally, the sensor 3900 could employ a polarization filter and take infrared (IR) measurements to detect the extent of curing of the hardenable material. Alternatively, the sensor could take a photograph and analyze the image for bubbles or contaminants (e.g., particles). For example, if the assessed surface quality is not within tolerances of the desired surface quality of the three-dimensional object, a controller can reselect an optical resolution according to the desired or predetermined surface quality of the three-dimensional object. Further, the sensor could detect a fill level of the hardenable material in the reservoir.

In any apparatus, the light altering structure is optionally located between the reservoir and light radiated from each of the first movable light engine and the second light engine. Such a configuration can be advantageous by enabling blending/mixing of light radiation from each of the two light engines. Any of a selectively transparent mirror, a beam splitter, or a beam combiner can be particularly useful when light radiation from more than one light engine will be blended. For instance, as mentioned above, the meaning of the term "selectively transparent" encompasses both a) being partially or fully transparent to certain wavelengths of light and b) being transparent to a certain amount of all wavelengths of light. When partially transparent, the term additionally refers to being partially reflective of other wavelengths of light or to an amount of all wavelengths of light. In any apparatus, the mirror is a dichroic mirror, which allows certain wavelengths of light to pass through the mirror while reflecting other wavelengths of light. Similarly, a beam splitter may be employed when light radiation from more than one light engine will be blended, such as by reflecting beams of incident light of certain wavelengths or polarizations provided by two or more light engines, while passing other wavelengths or polarizations through the beam splitter. Further, a beam combiner may be employed when light radiation from more than one light engine will be blended, such as by coupling two or more wavelength beams of light from different light engines into a single beam.

Optionally, a second (and also optionally a third, fourth, etc.) light altering structure is included in any apparatus. Such an additional one or more light altering structures are also located between the reservoir and light radiated from at least one light engine of the apparatus. When light from more than one light engine is mixed or blended together, often the dosage for each light engine is selected to collectively provide the same total dosage as would be provided if a single light engine was employed (e.g., with two light engines, each could provide 50% of the total dosage or one could provide 30% and the other could provide 70%, etc. With three light engines, the dosage split could be 20%, 30%, and 50%, for example.)

Typically, each of the first (movable) light engine and the second light engine comprises a light module and optics for focusing the light. Suitable light modules for each of the first light engine and the second light engine comprise a laser or a projector. Optionally, the light module of the first (movable) light engine comprises at least one laser (e.g., the light engine includes a galvanometer, lenses, collimation optics, and a light source). Optionally, the light module of the first (movable) light engine comprises a projector (e.g., the light engine includes both optics and a projector). The light module of the second light engine of certain apparatuses comprises a projector. Preferably, the optics of at least one of the first movable light engine or the second light engine comprises zoomable optics, having different zoom settings, each zoom setting preferably providing a different focal length for the radiated light. This is particularly advantageous when a light engine is movable and thus can be irradiating a focal plane from varying locations. The optics of any light engine can have a set focal length. Hence, the optical resolution of the apparatus can be selected and adjusted, if desired, by selecting a particular optics for at least one of the light engines available within the apparatus. Optionally, at least one of the light engines can also have a modular configuration, meaning the optics of at least one of the light engines can be interchanged in order to pair at least one of the light modules with different optics, preferably having different focal lengths. Alternatively, the light module of at least one of the light engines can be interchangeable in order to pair different light modules with one or more optics.

Data representing a three-dimensional object (e.g., article) may be generated using computer modeling such as computer aided design (CAD) data. The data is typically modified to provide a series of two-dimensional slices of image data. Image data representing the article design can be exported in STL format, or in any other suitable computer processable format, to the additive manufacturing equipment. Scanning methods to scan a three-dimensional object may also be employed to create the data representing the article. One exemplary technique for acquiring the data is digital scanning Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article).

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. For instance, a computing device often includes an internal processor, a display (e.g., a monitor), and one or more input devices such as a keyboard and a mouse.

An apparatus often further comprises a controller that provides commands to one or more portions of the apparatus during manufacturing of a three-dimensional object according to an image of the three-dimensional object in a computer readable format, such as computer aided design (CAD) parameters (e.g., a data file). The controller may be configured to select at least one light radiation configuration from two or more light radiation configurations available for the first movable light engine. Suitable aspects of a light radiation configuration include for instance, a voltage, a dosage, an optical resolution, a wavelength, a greyscale map, a greyscale mask, or any combinations thereof. Controlling a voltage can affect the intensity of light emitted by the light engine. Controlling a dosage can affect the total amount of light dose emitted by the light engine. Controlling an optical resolution can affect the precision (e.g., pixel size) of the light emitted by the light engine. Controlling a wavelength can affect the ability of light emitted to cure a hardenable material. If two different wavelengths are employed by separate light engines, the controller may also need to adjust the energy of each dosage to achieve the same absorbance by the photoinitiators being irradiated by the light emitted by each light engine. Controlling a greyscale map can affect the location and intensity of light radiation that is directed towards a hardenable material. Additionally, when a light engine is moved during light emission, typically the controller also changes the greyscale map to maintain a constant dosage. Controlling a greyscale mask can affect whether or not a greyscale filter (that affects the location and intensity of light radiation that reaches specific pixels of a hardenable material) is physically located between the light engine(s) and the hardenable material.

An apparatus having a controller optionally further comprises a memory. The memory is configured to store settings of predetermined desired qualities of at least one three-dimensional object to be manufactured. Suitable qualities of a three-dimensional object include surface qualities, part tolerances, and/or part characteristics. For instance, a surface of a three-dimensional object may require a higher resolution than a bulk of the object. Similarly, a three-dimensional object may require a specific narrow tolerance range in one or more part dimensions. The controller is configured to communicate with the memory to select the first light radiation configuration and the second light radiation configuration based on the settings selected from the memory.

As mentioned above, the term "light radiation configuration" refers collectively to light engine components (e.g., light source, optics, etc.), designs, and settings (e.g., wavelengths, dosages, optical resolution, zoom, etc.). A change in even a single feature of the light radiation configuration results in a different light radiation configuration as compared to prior to the change. For instance, a first light radiation configuration comprising a first optical resolution that is different from a second optical resolution of a second light radiation configuration provides first and second light radiation configurations that are different from each other. Similarly, a first light radiation configuration comprising a light module (e.g., a projector) that is different from a second light module (e.g., a laser) of a second light radiation configuration provides first and second light radiation configurations that are different from each other. In another example, everything could be the same between a first light radiation configuration and a second light radiation configuration except the first light radiation configuration employs a greyscale map and the second light radiation configuration does not employ a greyscale map. Of course, having multiple differences between first and second light engines also meets the definition of light radiation configurations that differ between the first and second light engines.

Methods

In a second aspect, a method of manufacturing a three-dimensional object is provided. The method comprises:
  a) obtaining a hardenable material disposed in a reservoir;
  b) selectively radiating light having a first light radiation configuration from a first movable light engine, the light optionally contacting a light altering structure, wherein a portion of the light is directed onto a first focal plane within the hardenable material to selectively form a first portion of hardened material; and
  c) selectively radiating light having a second light radiation configuration from a second light engine, the light optionally contacting the light altering structure, wherein at least a portion of the light is directed onto a second focal plane within the hardenable material to selectively form a second portion of hardened material, wherein the second light radiation configuration is different than the first light radiation configuration and wherein the light from at least one of the first movable light engine or the second light engine contacts the light altering structure;
  wherein the hardened material is a three-dimensional object and wherein the first portion of hardened material has a physical quality that is different than the second portion of hardened material.

Figure 4:
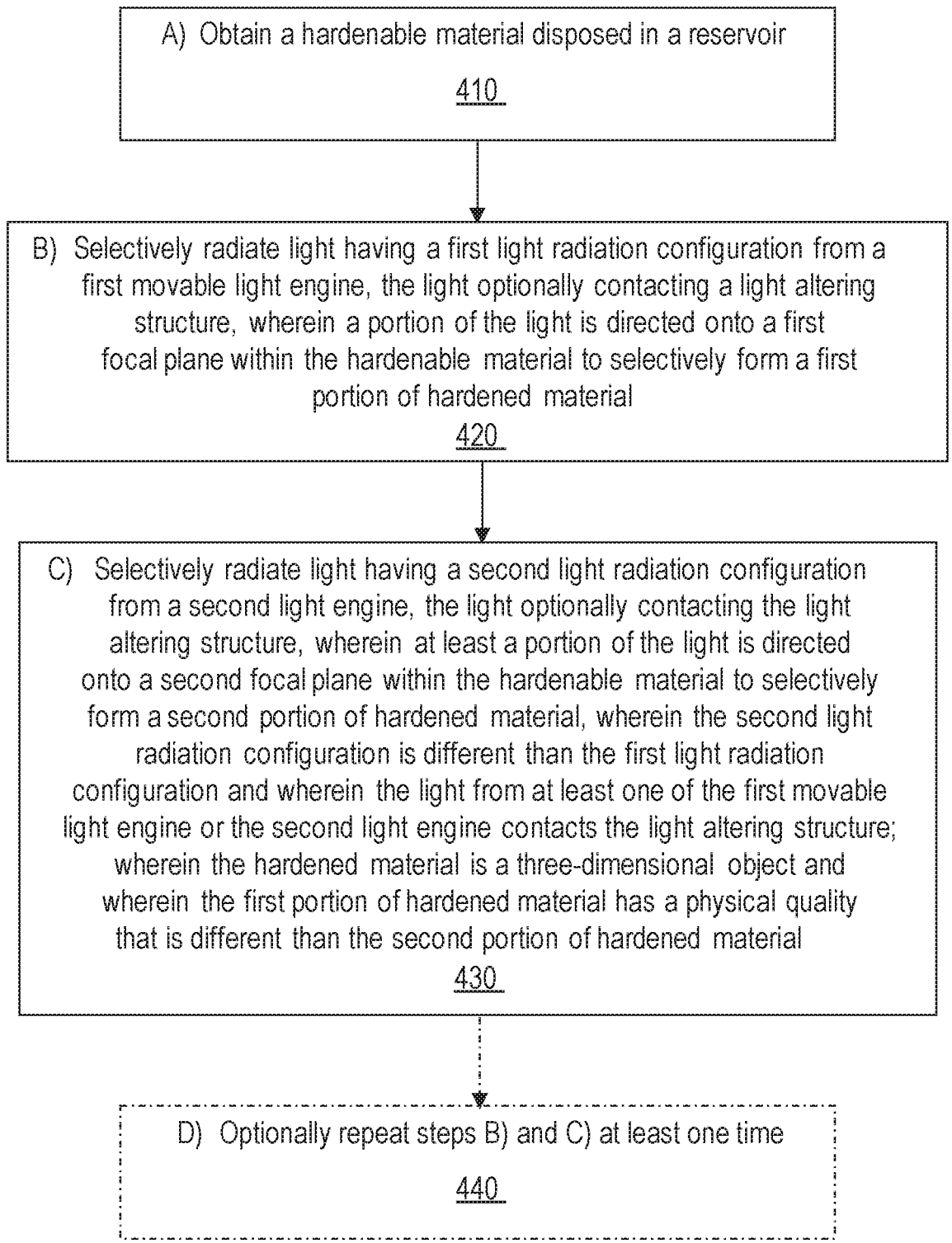
FIG. 4 is a flow chart of an exemplary method of the present disclosure.

Referring to FIG. 4, a flow chart is provided of the method of the second aspect. More particularly, the method comprises Step 410 to a) obtain a hardenable material disposed in a reservoir; and Step 420 to b) selectively radiate light having a first light radiation configuration from a first movable light engine, the light optionally contacting a light altering structure, wherein a portion of the light is directed onto a first focal plane within the hardenable material to selectively form a first portion of hardened material. The method further comprises Step 430 to c) selectively radiate light having a second light radiation configuration from a second light engine, the light optionally contacting the light altering structure, wherein at least a portion of the light is directed onto a second focal plane within the hardenable material to selectively form a second portion of hardened material, wherein the second light radiation configuration is different than the first light radiation configuration and wherein the light from at least one of the first movable light engine or the second light engine contacts the light altering structure; wherein the hardened material is a three-dimensional object and wherein the first portion of hardened material has a physical quality that is different than the second portion of hardened material.

One composition that may be useful in methods according to the present disclosure is as described in co-owned International Application Publication No. WO 2018/038954 (Raia et al.). For instance, a colored curable composition for use in an additive manufacturing process is described, the composition comprising:
  a curable resin composition comprising radiation curable components,
  a photoinitiator,
  a dye composition comprising a dye D1 and a dye D2, dye D1 having a light absorption maximum within a wavelength range from 400 nanometers (nm) to 530 nm; dye D2 showing a light absorption maximum within a wavelength range from 540 nm to 650 nm.

Further details regarding such curable compositions are as described in WO 2018/038954 (Raia et al.).

Another composition that may be useful in methods according to the present disclosure is as described in co-owned International Application Publication No. WO 2018/231583 (Hermann et al.). For instance, such a hardenable (e.g., photopolymerizable) composition may comprise:
  a resin matrix comprising:
  polymerizable (meth)acrylate(s) not comprising a urethane moiety,
  polymerizable urethane(meth)acrylate(s),
  wherein the polymerizable (meth)acrylate(s) not comprising a urethane moiety are used in excess over the polymerizable urethane(meth)acrylate(s),
  a filler matrix comprising:
  nanocluster(s),
  optionally fumed silica, preferably in an amount below 8 wt. %,
  the filler matrix being present preferably in an amount of 5 to 45 wt. %,
  an initiator system comprising:
  photoinitiator(s),
  organic dye(s),
  the curable composition not comprising softener in an amount of more than 5 wt. %
  with respect to the weight of the whole composition,
  the curable composition having a viscosity below 150 Pa*s at 23° C. and a shear rate of 1 $s^{-1}$.

Further details regarding such photopolymerizable (e.g., curable) compositions are as described in WO 2018/231583 (Hermann et al.).

When manufacturing a (physical) three-dimensional object with an apparatus described herein, a hardenable material can first be provided in the reservoir. Lights having a first radiation configuration and a second light radiation configuration are directed onto a first focal plane and a second focal plane, respectively, within the hardenable material disposed in the reservoir. Thereby, at least a portion of the hardenable material is hardened onto the build plate of the apparatus, or onto a preform attached to the build plate, as a layer of hardened material forms at least a portion of the three-dimensional object to be manufactured.

The first portion of hardened material is typically integrally formed with the second portion of hardened material. As mentioned above, the term "integral" means composed of parts that together constitute a whole. As such, an integrally formed hardened material is incapable of being separated without damaging one or more of the (integral) parts. Use of an apparatus disclosed herein can advantageously provide a hardened material (e.g., three-dimensional object) that has certain desired varying physical qualities due to light irradiation from the (at least two) different light radiation configurations. Exemplary physical qualities that can differ between the first portion of the hardened material (formed from light radiated onto the first focal plane) and the second portion of the hardened material (formed from light radiated onto the second focal plane) include surface qualities (e.g., surface resolution), part tolerances, and/or part characteristics, as noted above.

In many cases, the steps b) and c) are performed at least partially simultaneously. For instance, referring back to FIG. 2, both of the first focal plane 2220 and the second focal plane 2320 are shown to be directed at the hardenable material 2150 in the illustration of the apparatus 2000. Moreover, FIG. 2 shows a case in which the light 2310 radiated from the second light engine 2300 contacts the light altering structure 2400 and at least a portion of the light 2310 is reflected onto the second focal plane 2320. When the amount of time required to irradiate each focal plane is different, steps b) and c) cannot be performed completely simultaneously. While it is certainly not necessary for steps b) and c) to be performed at all simultaneously, to do so provides greater efficiency to an additive manufacturing process than performing steps b) and c) completely separately due to the amount of time required for each of steps b) and c). The method usually further comprises moving the first movable light engine before or after at least one of steps b) or c).

Referring again to FIG. 4, the method generally further comprises Step 440 to d) optionally repeat steps b) and c) at least one time. Most three-dimensional objects are composed of more than one layer, thus typically steps b) and c) are repeated one or more times. Accordingly, methods of printing a three-dimensional object described herein can include forming the article from a plurality of layers of a hardenable composition in a layer-by-layer manner.

Generally, the method further comprises displacing the hardened material relative to each of the first focal plane and the second focal plane. For instance, the hardened material is often displaced in the z-direction (relative to the two focal planes) by displacing the build platform, and thus the build plate, if present, by means of a displacing device (e.g., an elevator mechanism that raises and/or lowers the build platform with respect to the two focal planes). Moreover, the reservoir can additionally or alternatively be displaced by means of a displacing device. In some cases, the hardened material is displaced discontinuously by displacing the hardened material by a variable or constant step size during the additive manufacturing method. In alternate cases, the hardened material is displaced continuously and concurrently with at least one of step b) or c) by displacing the hardened material at a set or variable displacement speed. After displacing the hardened material, preferably at least one further layer of hardenable material is hardened onto the three-dimensional object. Optionally, the desired or required physical qualities of the hardened material can be reassessed and can be re-selected, to optionally adjust the light radiation configuration(s) or maintain those selected previously.

In any method, the first light radiation configuration may be selected by selecting at least one light engine from a plurality of light engines (e.g., projector or laser), each light engine having a different set optical resolution. In any method, each of the first light radiation configuration and the second light radiation configuration comprises an optical resolution, wherein a first optical resolution is selected by selecting a first optics and a second optical resolution is selected by selecting a second optics that are different from the first optics. Optionally, each of the first light radiation configuration and the second light radiation configuration comprises an optical resolution, wherein a first optical resolution is selected by selecting a first zoom setting of zoomable optics and a second optical resolution is selected by selecting a second zoom setting of zoomable optics that is different from the first zoom setting.

In any method, a controller is present and modifies a dosage of light provided by the first light radiation configuration and/or the second light radiation configuration. For instance, the light radiated from each of the first movable light engine and the second light engine may be modified by a controller to together provide a same light dose as would be achieved by light radiated from only one of the first movable light engine or the second light engine without modification of the light. Such modification may advantageously minimize the formation of artefacts and/or material inhomogeneity in overlapping areas of the first focal plane and the second focal plane.

In any method, as described above, each of the first light radiation configuration and the second light radiation configuration independently comprises a voltage, a dosage, an optical resolution, a wavelength, a greyscale map, a greyscale mask, or combinations thereof.

Optionally, the method further comprises providing a second hardenable material in direct contact with a portion of the three-dimensional object and selectively irradiating light on a portion of the second hardenable material to provide a composite three-dimensional object formed of at least two different materials. For instance, this could be accomplished by removing the reservoir containing the (first) hardenable material and replacing it with a different reservoir containing the second hardenable material. Accordingly, such a method advantageously enables combining hardenable materials having differing light irradiation requirements within the same method/apparatus.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:
1. A stereolithographic additive manufacturing apparatus comprising:
   a) a reservoir for receiving hardenable material;
   b) a first light engine providing a first light radiation configuration, the first light engine configured to radiate light onto a first focal plane within the reservoir containing the hardenable material, wherein the first light engine is a movable laser;

c) a second light engine providing a second light radiation configuration that is different than the first light radiation configuration, the second light engine configured to radiate light onto a second focal plane within the reservoir containing the hardenable material; and
d) a light altering structure located between the reservoir the first light engine and the second light engine, such that light radiated from each of the first light engine and the second light engine is configured to contact the light altering structure, the light altering structure is selected from the group consisting of a dichroic mirror, a beam combiner and a beam splitter.

2. The additive manufacturing apparatus of claim 1, further comprising a second light altering structure located between the reservoir and one or more of the first light engine, and the second light engine, such that light radiated from one or more of the first light engine and the second light engine is configured to contact the second light altering structure.

3. The additive manufacturing apparatus of claim 1, further comprising a controller configured to select at least one light radiation configuration comprising a voltage, a dosage, an optical resolution, a wavelength, a greyscale map, a greyscale mask, or combinations thereof, from two or more light radiation configurations available for the first light engine.

4. The additive manufacturing apparatus of claim 1, wherein each of the first light engine and the second light engine comprises a light module and optics for focusing light.

5. The additive manufacturing apparatus of claim 4, wherein the optics of at least one of the first light engine and the second light engine comprises zoomable optics.

6. The additive manufacturing apparatus of claim 1, wherein the first focal plane at least partially overlaps the second focal plane.

7. The additive manufacturing apparatus of claim 1, wherein the second light engine is movable and is configured to be moved in at least one axis.

8. The additive manufacturing apparatus of claim 1, further comprising a sensor directed at the reservoir, the sensor configured to observe a process characteristic selected from bubbles present in the hardenable material, a fill level of the hardenable material in the reservoir, presence of contaminants in the hardenable material, defects or deviations from a product design of a three-dimensional object, and a combination thereof.

9. The additive manufacturing apparatus of claim 1, wherein the light altering structure comprises a rotatable dichroic mirror.

10. A method of additive manufacturing a three-dimensional object with an additive manufacturing apparatus of claim 1, the method comprising:
a) obtaining a hardenable material disposed in a reservoir;
b) selectively radiating light having a first light radiation configuration from a first light engine, the light optionally contacting a light altering structure, wherein a portion of the light is directed onto a first focal plane within the hardenable material to selectively form a first portion of hardened material; and
c) selectively radiating light having a second light radiation configuration from a second light engine, the light optionally contacting the light altering structure, wherein at least a portion of the light is directed onto a second focal plane within the hardenable material to selectively form a second portion of hardened material, wherein the second light radiation configuration is different than the first light radiation configuration and wherein the light from at least one of the first light engine or the second light engine contacts the light altering structure;
wherein the hardened material is a three-dimensional object and wherein the first portion of hardened material has a physical quality that is different than the second portion of hardened material.

11. The method of claim 10, wherein the steps b) and c) are performed at least partially simultaneously.

12. The method of claim 10, further comprising repeating steps b) and c) at least one time.

13. The method of claim 10, wherein each of the first light radiation configuration and the second light radiation configuration comprises an optical resolution, wherein a first optical resolution is selected by selecting a first optics and a second optical resolution is selected by selecting a second optics that are different from the first optics or the first optical resolution is selected by selecting a first zoom setting of zoomable optics and the second optical resolution is selected by selecting a second zoom setting of zoomable optics that is different from the first zoom setting.

14. The method of claim 10, wherein the light radiated from the second light engine contacts the light altering structure and a portion of the light is reflected onto the second focal plane.

15. The method of claim 10, further comprising moving the first light engine before or after at least one of steps b) or c).

16. The method of claim 10, wherein the light radiated from each of the first light engine and the second light engine is modified by a controller to together provide a same light dose as would be achieved by light radiated from only one of the first light engine or the second light engine without modification of the light.

17. The method of claim 10, further comprising providing a second hardenable material in direct contact with a portion of the three-dimensional object and selectively irradiating light on a portion of the second hardenable material to provide a composite three-dimensional object formed of at least two different materials.

18. The additive manufacturing apparatus of claim 1, further comprising:
a third light engine; and
a second light altering structure located between the reservoir and one or more of the first light engine, the second light engine, and the third light engine,
wherein light radiated from one or more of the first light engine, the second light engine, and the third light engine is configured to contact the second light altering structure.

19. An additive manufacturing apparatus comprising:
a) a reservoir for receiving hardenable material;
b) a first light engine providing a first light radiation configuration, the first light engine configured to radiate light onto a first focal plane within the reservoir containing the hardenable material, wherein the first light engine is a movable laser;
c) a second light engine providing a second light radiation configuration that is different than the first light radiation configuration, the second light engine configured to radiate light onto a second focal plane within the reservoir containing the hardenable material; and
d) a first light altering structure located between the reservoir and one or more of the first light engine and the second light engine, such that light radiated from one or more of the first light engine and the second light engine is configured to contact the first light altering structure, and e) a second light altering structure located between the reservoir and one or more of the first light engine and the second light engine, such that light radiated from each of the first light engine and the second light engine is configured to contact the second light altering structure, wherein the first light altering structure is selected from the group consisting of a dichroic mirror, a beam combiner and a beam splitter.

20. The additive manufacturing apparatus of claim 19, further comprising:

a third light engine; and a second light altering structure located between the reservoir and one or more of the first light engine, the second light engine, and the third light engine, wherein light radiated from one or more of the first light engine, the second light engine, and the third light engine is configured to contact the second light altering structure.

* * * * *